UNITED STATES PATENT OFFICE 2,077,133

PRODUCTION OF SULPHONIC ACIDS AND THE SALTS THEREOF

Robert L. Sibley, Nitro, W. Va., assignor, by mesne assignments, to Monsanto Chemical Company, St. Louis, Mo., a corporation of Delaware No Drawing. Application July 17, 1934, Serial No. 735,689

20 Claims. (Cl. 260—1)

This invention relates to the production of sulphonic acids and the salts thereof and comprises the method of preparation of the new class of materials as well as the chemical products so produced.

According to the present invention a new class of chemical materials has been prepared by treating a rubber, for example pale crepe rubber, or a rubber distillate, as for example a liquid obtained by destructively distilling rubber at atmospheric pressure and collecting the distillate therefrom, said distillate having a boiling range of substantially 18° C. to 350° C. or thereabouts, with an alkylating agent, as for example alcohol and a convenient sulphonating agent, as for example concentrated sulphuric acid, oleum, chlorsulphonic acid, and the like. The product so obtained may be isolated as the corresponding free acid or the metallic salts thereof.

As examples of alcohols which may be employed in the preparation of the new class of chemical products are ethyl alcohol, butyl alcohol, propyl alcohol, amyl alcohol, hexyl alcohol, heptyl alcohol, cyclohexanol, benzyl alcohol and their chemical equivalents. However, instead of the alcohols mentioned above, other alkylating and aralkylating agents may be conveniently employed. Thus, the halides, for example butyl chloride, propyl bromide, amyl iodide, heptyl chloride, cyclohexyl chloride, benzyl chloride and the like may be substituted for their corresponding alcohols in the treatment with a rubber or a rubber distillate and the resultant material sulphonated in a convenient manner. Again if convenient or desirable acid sulphates of alcohols may be employed as the alkylating or aralkylating agent.

The following examples will further illustrate the nature of the present invention which are understood as specific embodiments of the invention and not in any way limitative of the scope thereof.

Example I 70 parts by weight of a distillate obtained by distilling pale crepe rubber at atmospheric pressure and having a boiling range of substantially 18° C. to 350° C. and 140 parts by weight of butyl alcohol were placed in a suitable reactor, and 700 parts by weight of 93% sulphuric acid added slowly thereto with agitation at a temperature of substantially 40 to 45° C. After the addition of the acid was completed, heating and agitation were continued for substantially four hours at a temperature of substantially 45 to 50° C. The product so obtained was diluted with water and sufficient lime added thereto to effect a conversion of the free sulphonic acid and excess sulphuric acid to the calcium salts, after which the insoluble calcium sulphate formed was filtered off. To the filtrate comprising an aqueous solution of the calcium salt of butylated and sulphonated rubber distillate, sufficient sodium carbonate was added to convert the calcium salt of the butylated and sulphonated rubber distillate to the sodium salt. The insoluble calcium carbonate formed thereby was filtered off and the filtrate concentrated, whereupon the white waxy solid which separated was filtered and dried. The product so obtained, 203 parts by weight, comprising a white crystalline solid, somewhat waxy in nature, is readily soluble in ethyl acetate and ethyl alcohol, very slightly soluble in acetone, fairly soluble in hot butyl alcohol and substantially insoluble in ether, petroleum ether, benzol, chloroform and carbon tetrachloride.

Example II

The calcium salt of the butylated and sulphonated rubber distillate was conveniently prepared by evaporating to dryness a portion of an aqueous solution thereof, prepared in the manner described in Example I. The material thus obtained comprising a white crystalline solid is soluble in ethyl alcohol, but substantially insoluble in acetone and benzol.

Example III

The potassium salt of the butylated and sulphonated rubber distillate was conveniently prepared by treating an aqueous solution of the calcium salt, prepared as in Example I, with potassium carbonate, filtering off the insoluble calcium carbonate which precipitated, and evaporating the filtrate to dryness. The white solid thus obtained is soluble in hot ethyl alcohol, nearly insoluble in cold ethyl alcohol and substantially insoluble in acetone and benzene.

Example IV

The free sulphonic acid of the butylated and sulphonated rubber distillate was prepared by treating the aqueous solution of the corresponding calcium salt, prepared as in Example I, with sulphuric acid, extracting with a convenient solvent, for example ether and removing the solvent therefrom by a convenient method, for example by distillation or evaporation. The free sulphonic acid so obtained comprises a colorless crystalline solid having a low melting point and which gradually develops color formation and is soluble in water, acetone and alcohol but substantially insoluble in benzol.

Example V 105 parts by weight of rubber distillate obtained by distilling pale crepe rubber at atmospheric pressure and 285.3 parts by weight of cyclohexanol were placed in a suitable reactor, 1050 parts by weight of 93% sulphuric acid added slowly thereto with agitation at a temperature of substantially 45° C. to 50° C. over a period of substantially 8 hours. To the sulphonation product so obtained water was added and neutralization effected by the addition of lime after which the calcium sulphate produced and excess lime were filtered therefrom. To the filtrate comprising an aqueous solution of the calcium salt of the reaction product of rubber distillate, cyclohexanol and sulphuric acid, sodium carbonate was added, thus converting the calcium salt to the sodium salt. After filtering off the insoluble calcium carbonate, the filtrate comprising an aqueous solution of the sodium salt was evaporated to dryness and 91.6 parts by weight of a white solid obtained.

Example VI 130.2 parts by weight of ethyl alcohol and 105 parts by weight of rubber distillate, prepared as hereinbefore set forth, were placed in a suitable reactor, 1050 parts by weight of 93% sulphuric acid added slowly thereto with agitation at a temperature of substantially 45° C. to 50° C. On completion of the addition of the acid, agitation was continued for an additional period of 4 hours at a temperature of substantially 45° C. to 50° C. The formation of the calcium salt and isolation of the sodium salt thereof was effected in a manner analogous to that employed in the preparation of Example I. The sodium salt of the ethylated and sulphonated rubber distillate so obtained, 174 parts by weight, is a white solid readily soluble in water.

Example VII 35 parts by weight of pale crepe rubber, 70 parts by weight of butyl alcohol and 1 part by weight of a catalyst, for example piperidine, were placed in a suitable reactor and refluxed for substantially three hours after which 350 parts by weight of 93% sulphuric acid were added slowly thereto with agitation at a temperature of substantially 30° C. to 45° C. Additional heating and agitation were carried out for three hours at a temperature of substantially 55° C. to 60° C. after which the reaction product was cooled, treated with lime and converted to the sodium salt in a manner analogous to that employed in Example I. On evaporation of the aqueous solution of the sodium salt, 42 parts by weight of a white waxy solid were obtained.

Other salts of the new class of materials may be prepared in a manner analogous to that described above. Thus the barium, and magnesium salts may be so obtained. Again other rubber distillates than those specified above may be employed in the preparation of the new class of compounds. Thus rubber may be distilled at reduced pressure and the resulting material employed in the manufacture of the new materials.

What is claimed is:

1. As a new article of manufacture an alkali metal salt of an alkylated and sulphonated rubber.

2. As a new article of manufacture the sodium salt of butylated and sulphonated rubber.

3. A method of preparing a new chemical compound comprising interacting rubber with butyl alcohol and sulphuric acid and isolating the product so produced as its sodium salt.

4. As a new article of manufacture, a sulphonated reaction product of an alcohol and one member of group consisting of rubber and substantially its entire destructive distillate at atmospheric pressure, said distillate having a boiling range of substantially 18° to 350° C. at atmospheric pressure.

5. As a new article of manufacture, a sulphonated reaction product of an alcohol and one member of a group consisting of rubber and substantially its entire destructive distillate at atmospheric pressure, said distillate having a boiling range of substantially 18° to 350° C. at atmospheric pressure, and its water-soluble metallic salts.

6. As a new article of manufacture, a reaction product produced by interacting substantially the entire rubber distillate obtained by the destructive distillation of rubber at atmospheric pressure and having a boiling range of substantially 18° to 350° C. at atmospheric pressure, with an alcohol and a sulphonating agent and its water-soluble metallic salts.

7. As a new article of manufacture an alkylated and sulphonated rubber distillate, said distillate being substantially the entire distillate obtained by the destructive distillation of rubber at atmospheric pressure and having a boiling range of substantially 18° to 350° C. at atmospheric pressure.

8. As a new article of manufacture a water-soluble salt of an alkylated and sulphonated rubber distillate, said distillate being substantially the entire distillate obtained by the destructive distillation of rubber at atmospheric pressure and having a boiling range of substantially 18° to 350° C. at atmospheric pressure.

9. As a new article of manufacture an alkali metal salt of an alkylated and sulphonated rubber distillate, said distillate being substantially the entire distillate obtained by the destructive distillation of rubber at atmospheric pressure and having a boiling range of substantially 18° to 350° C. at atmospheric pressure.

10. As a new article of manufacture an alkali metal salt of a butylated and sulphonated rubber distillate, said distillate being substantially the entire distillate obtained by the destructive distillation of rubber at atmospheric pressure and having a boiling range of substantially 18° to 350° C. at atmospheric pressure.

11. As a new article of manufacture the sodium salt of butylated and sulphonated rubber distillate, said distillate being substantially the entire distillate obtained by the destructive distillation of rubber at atmospheric pressure and having a boiling range of substantially 18° to 350° C. at atmospheric pressure.

12. As a new article of manufacture the sodium salt of ethylated and sulphonated rubber distillate, said distillate being substantially the entire distillate obtained by the destructive distillation of rubber at atmospheric pressure and having a boiling range of substantially 18° to 350° C. at atmospheric pressure.

13. A method of preparing a new chemical compound comprising interacting one member of a group consisting of rubber and substantially its entire distillate at atmospheric pressure, said distillate having a boiling range of substantially 18° to 350° C. at atmospheric pressure, with an alkylating agent and a sulphonating agent.

14. A method of preparing a new chemical compound comprising interacting one member of a group consisting of rubber and substantially its entire destructive distillate at atmospheric pressure, said distillate having a boiling range of substantially 18° to 350° C. at atmospheric pressure, with an alcohol and a sulphonating agent and converting to a salt thereof.

15. A method of preparing a new chemical compound comprising interacting substantially the entire rubber distillate obtained by the destructive distillation of rubber at atmospheric pressure, said distillate having a boiling range of substantially 18° to 350° C. at atmospheric pressure, with an alkylating agent and a sulphonating agent and isolating the product so produced as its water-soluble salt.

16. A method of preparing a new chemical compound comprising interacting substantially the entire rubber distillate obtained by the destructive distillation of rubber at atmospheric pressure, said distillate having a boiling range of substantially 18° to 350° C. at atmospheric pressure, with an alcohol and sulphuric acid and isolating the product as its alkali metal salt.

17. A method of preparing a new chemical compound comprising interacting substantially the entire rubber distillate obtained by the destructive distillation of rubber at atmospheric pressure, said distillate having a boiling range of substantially 18° to 350° C. at atmospheric pressure, with an aliphatic alcohol and sulphuric acid and isolating the product so produced as its alkali metal salt.

18. A method of preparing a new chemical compound comprising interacting substantially the entire rubber distillate obtained by the destructive distillation of rubber at atmospheric pressure, said distillate having a boiling range of substantially 18° to 350° C. at atmospheric pressure, with butyl alcohol and sulphuric acid and isolating the product so produced as its sodium salt.

19. A method of preparing a new chemical compound comprising interacting substantially the entire rubber distillate obtained by the destructive distillation of rubber at atmospheric pressure, said distillate having a boiling range of substantially 18° to 350° C. at atmospheric pressure, with ethyl alcohol and sulphuric acid and isolating the product so produced as its sodium salt.

20. As a new article of manufacture a metallic salt of an alkylated and sulphonated rubber.

ROBERT L. SIBLEY.